United States Patent [19]

Quimby

[11] Patent Number: 5,041,058
[45] Date of Patent: Aug. 20, 1991

[54] PORTABLE THRASHER

[75] Inventor: Dean Quimby, Larned, Kans.

[73] Assignees: Ronald J. Quimby, Larned, Kans.; Gene D. Quimby, Garber; Delmar Quimby, Owasso, both of Okla.; part interest to each

[21] Appl. No.: 535,577

[22] Filed: Jun. 11, 1990

[51] Int. Cl.[5] .............................................. A01F 5/00
[52] U.S. Cl. ...................................... 460/61; 56/16.5; 56/239
[58] Field of Search ..................... 460/61, 24, 45, 96, 460/901, 64, 65; 56/16.4, 16.5, 126, 219, 222, 239

[56] References Cited

U.S. PATENT DOCUMENTS

| | | |
|---|---|---|
| 739,908 | 9/1903 | Nightingale . |
| 1,910,357 | 5/1933 | Nye . |
| 2,399,718 | 5/1946 | Baker et al. . |
| 4,121,779 | 10/1978 | Mills et al. .......................... 241/79.2 |
| 4,337,782 | 7/1982 | Da Silva ............................... 460/64 |
| 4,417,593 | 11/1983 | Brehon .................................. 460/73 |

Primary Examiner—Terry L. Melius
Attorney, Agent, or Firm—Litman, McMahon & Brown

[57] ABSTRACT

A portable thrasher includes a housing with an interior, a mouth for passing crop heads into the interior, a grain discharge opening and a chaffe discharge opening. A thrashing assembly includes a primer mover mounted on the housing, a generally cylindrical flail subassembly driven by the prime mover and an oscillating sieve panel separating the housing interior into an upper, chaffee compartment and a lower, grain compartment.

20 Claims, 1 Drawing Sheet

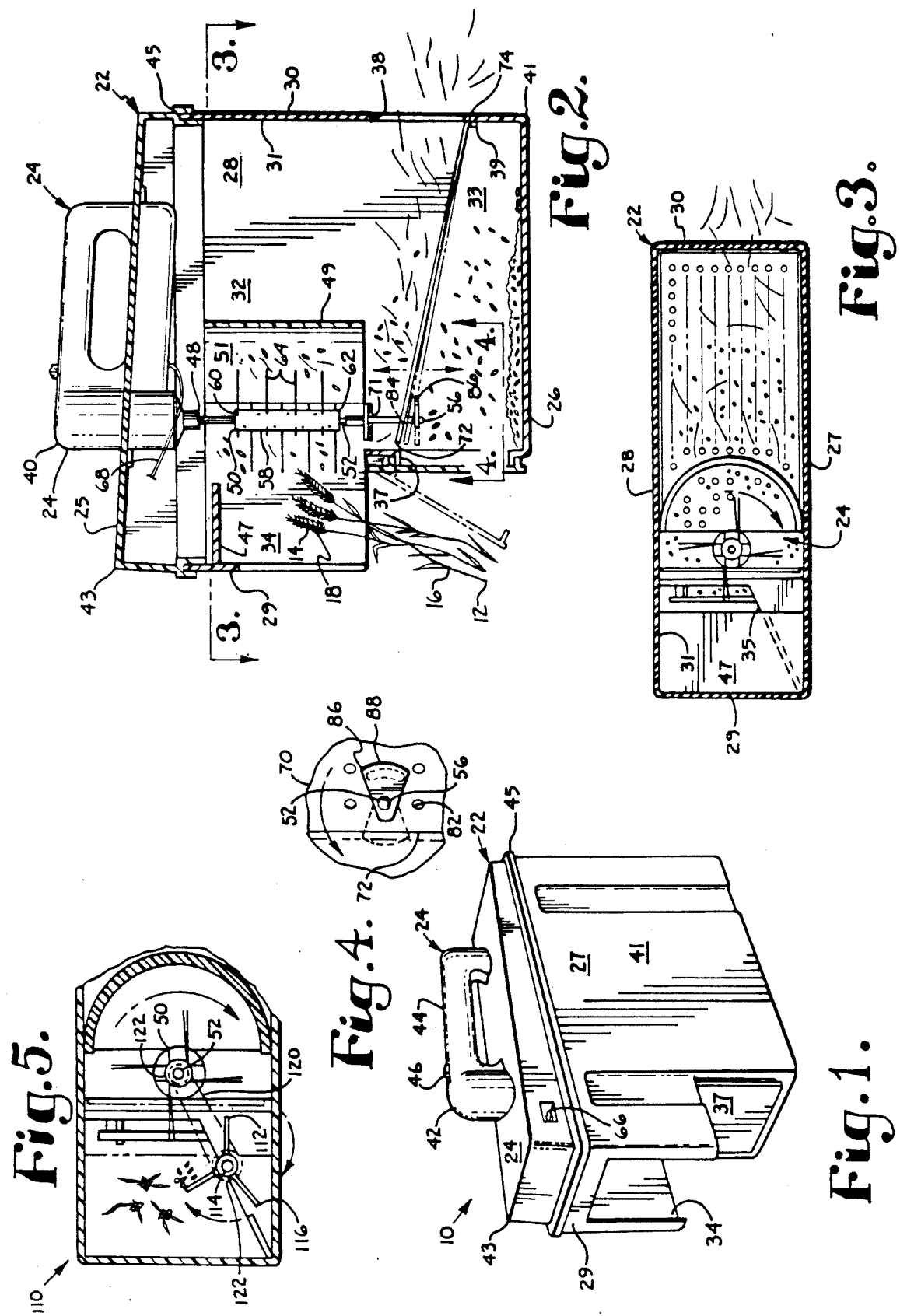

PORTABLE THRASHER

BACKGROUND OF THE INVENTION

1. Field of the Invention

The present invention relates generally to crop harvesting and more particularly to a portable thrasher for grain sampling.

2. Description of the Related Art

Various thrashers have heretofore been devised for harvesting grain crops. Thrashers designed for normal harvesting operations can be relatively large, complicated and expensive. These characteristics are consistent with the objectives of normal field harvesting operations, i.e. to maximize the crop yield in the shortest possible time with the lowest possible labor and fuel requirements.

Proper harvest timing can be important to maximize crop yields and also to obtain the best possible prices for the harvested crops. One timing factor involves the ripeness of the crops. Another factor involves their moisture contents, which can vary considerably over relatively short periods of time as the crops are exposed to precipitation and the drying effects of sun and wind. Harvesting a crop in a wet condition can result in a lower price being paid for it since crop buyers, such as cooperatives and grain elevators, often discount grain prices for excessive moisture content because higher moisture levels can cause problems of spoilage and heat buildup in the stored grain.

Relatively "wet" grain may require drying and/or mixing with drier grain for marketability. Grain buyers often compensate for these problems and extra processing costs by "docking" grain sellers for damp grain.

Crop moisture conditions in the fields can change in a few hours; for example, a heavy dew may cover a field early in the morning, and then substantially evaporate a few hours later. Thus, properly timing a grain harvest often involves timing within a matter of hours. Without hygrometers and other sophisticated equipment for determining moisture content, farmers and harvest workers often make estimates based upon their personal observations. However, such measuring and sampling methods can be relatively imprecise.

As an alternative, the harvesting equipment can be advanced into the field for a crop sample, which can then be analyzed for moisture content. However, much of the equipment designed for large scale field harvesting work is not particularly well suited for cutting and separating small samples, particularly moisture content analysis samples which generally require only a handful (e.g. about 250 grams or less) of grain. Some full-size equipment, therefore, tends to be wasteful when used for sampling since it thrashes considerably more grain than is needed for analysis purposes. Furthermore, transportation problems can be encountered with relatively large harvesting equipment, particularly when samples are needed from fields which are distant from each other. When remote fields are to be harvested, transporting large thrashers and combines to various distant locations can be expensive and inefficient when only small grain samples are needed.

A solution to some of these problems is to provide a portable thrasher, which can easily be transported from place to place and which is adapted for retrieving relatively small grain samples for moisture content analysis purposes. Such a thrasher is shown in the Brehon U.S. Pat. No. 4,417,593, and utilizes a beater and a fan system for thrashing grain both mechanically and pneumatically. However, the air handling system of the Brehon thrasher contributes substantially to its bulk, and it would be desirable to provide a more compact unit which can easily be carried by an individual. Furthermore, the Brehon thrasher is configured for feeding the grain heads downwardly into a conduit opening at the top of the thrasher, which might add the additional operational step of cutting the grain stalks prior to thrashing.

The present invention addresses some of these problems by providing a relatively compact thrasher which is adapted for gathering grain heads as they are found in the field.

SUMMARY OF THE INVENTION

In the practice of the present invention, a portable thrasher is provided which includes a housing with an interior, a mouth through which grain heads can pass to the interior, a grain discharge opening and a chaffe discharge opening. A thrasher assembly includes a prime mover which can have an electric motor powered by a rechargeable battery. The thrasher assembly also includes a generally cylindrical flail subassembly which can be rotated by the prime mover and which includes a cylinder with multiple tines extending radially therefrom. A perforated sieve plate is mounted generally below the flail subassembly and divides the housing interior into an upper, chaffe compartment and a lower, grain compartment. A cam plate can be rotated with the flail subassembly for oscillating the sieve plate. As an alternative embodiment of the present invention, an impeller assembly is provided in the area of the mouth opening for impelling crop heads into the housing interior.

OBJECTS AND ADVANTAGES OF THE PREFERRED EMBODIMENTS

The principal objects and advantages of the present invention include: providing a portable thrasher, providing such a thrasher which can be carried into a grain field by one person; providing such a thrasher which is adapted for gathering and thrashing relatively small amounts of grain; providing such a thrasher which is adapted for gathering and thrashing grain samples which are suitable for moisture content analysis; providing such a thrasher which is suitable for collecting and thrashing small amounts of grain for feeding livestock; providing such a thrasher which thrashes grain substantially through mechanical actions; providing such a thrasher which can be driven by various types of motors; providing such a thrasher which is usable on various above-ground crops, particularly grain crops with heads; providing such a thrasher with relatively few moving parts; providing such a thrasher which is economical to manufacture, efficient in operation, capable of a long operating life and particularly well adapted for the proposed useage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a top, front, left side perspective view of a portable thrasher, embodying the present invention.

FIG. 2 is an enlarged, vertical, longitudinal cross-section thereof.

FIG. 3 is a horizontal cross-section thereof, taken generally along 3—3 in FIG. 2.

FIG. 4 is an enlarged, fragmentary, horizontal cross-section thereof, taken generally along line 4—4 in FIG. 2.

FIG. 5 is an enlarged, horizontal, fragmentary, cross-section of a thrasher comprising a first modified or alternative embodiment of the present invention.

DETAILED DESCRIPTION OF THE PREFERRED EMBODIMENT

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of similar import.

Referring to the drawings in more detail, the reference numeral 10 generally designates a portable thrasher or thresher for thrashing crop plants 12. Without limitation on the generality of useful applications of the thrasher 10, as used herein thrashing or threshing generally involves drawing a head 14 of a crop plant 12 with a stalk 16 into the thrasher 10, removing a substantial part of the head 14, and separating the removed portions into grain 18 (i.e. beans, seeds, kernels, etc.) and chaffe 20. The thrasher 10 may be useful for thrashing a variety of above-ground crops, particularly crops with seed-bearing heads such as milo, rye, barley, oats and wheat. The thrasher embodying the present invention can also be configured for thrashing other crops such as corn and soybeans.

The thrasher 10 generally comprises a housing 22 and a thrashing assembly 24.

II. Housing 22

The housing 22 includes: top and bottom panels 25, 26; first (left) and second (right) side walls 27, 28; front and back end walls 29, 30; and an interior 31 divided into upper and lower compartments 32, 33. A frontwardly and downwardly-open mouth 34 is formed in the front wall 29 and is open to the interior upper compartment 32. A mouth guide panel 35 extends inwardly and rearwardly from the front wall 29 whereby the mouth 34 has a tapering configuration which converges rearwardly and towards the right side wall 28.

A grain discharge opening 36 with a hinged door 37 is formed in a lower portion of the front wall 29 below and behind the mouth 34, and selectively provides access to the lower compartment 33. A chaffe discharge opening 38 is formed in the back wall 30 and provides egress from the upper compartment 32 for the chaffe 20. A lip 39 extends transversely across the back wall 30 and projects forwardly into the interior 31 below the chaffe discharge opening 38. The housing 22 can be formed in two parts, a lower, main body 41 and an upper cover 43, which can be interconnected by a suitable perimeter seam 45.

A transverse plate 47 extends between the side walls 27, 28 over the mouth opening 34. An arcuate grain shield 49 with a general configuration of a half-cylinder extends between the side walls 27, 28 behind the mouth opening 34 and is rearwardly-convex to define a flailing chamber 51 within the upper compartment 32.

III. Thrasher Assembly 24

The thrasher assembly 24 includes a prime mover or drive unit 40 which can comprise, for example, an electric motor with a rechargeable battery. FIGS. 1 and 2 show a motor and battery unit 42 of the type commonly used for hand-held, portable mixers. The unit 42 includes a handle 44 with a thumb switch 46 and a drive coupling 48. The unit 42 is mounted in the housing top panel 25. A charging jack 66 is mounted in the left side wall 27 and is connected to the motor and battery unit 42 by an electrical lead 68.

A generally cylindrical flail subassembly 50 includes a drive shaft 52 with an upper end 54 drivingly connected to the drive coupling 48 and a lower end 56. A flail cylinder or body 58 is coaxially mounted on the drive shaft 52 and includes upper and lower ends 60, 62 positioned between the shaft upper and lower ends 54, 56. A plurality of tines 64 extend generally radially outwardly from the cylinder 58. The tines 64 preferably comprise a somewhat resilient material, the resiliency and flexibility being variable for particular operating conditions. The placement and orientation of the tines 64 on the cylinder 58 can also be varied to accommodate performance and manufacturing considerations.

A transverse bar 67 extends between the side walls 27, 28 below the flailing chamber 51 and includes a generally centered receiver 71 rotatably receiving the drive shaft 52. A bearing 69 is mounted on the drive shaft 52 and rotates on top of the transverse bar 67.

A perforated sieve panel 70 includes a front end 72, a back end 74 resting on the lip 39 of the housing back wall 30 and first and second side edges 78, 80 located in proximity to the housing first and second side walls 27, 28. The sieve panel 70 includes multiple perforations 82, which can be sized to pass the seeds 18 of a particular crop plant 12 being thrashed. A sieve receiver 84 is provided near the panel front end 72 and rotatably receives the drive shaft lower end 56. A cam plate 86 is mounted on the shaft lower end 56 and includes a lobe 88 projecting laterally and horizontally from the rotational axis of the flail subassembly 50. The cam plate 86 can be removable for changing the sieve panel 70 whereby multiple, interchangeable sieve panels 70 having different sizes of perforations 82 can be provided with the thrasher 10 to thrash various grains.

IV. Operation

In operation, the thrasher 10 is adapted for sampling grain in the field by holding it in a substantially level position as shown in FIG. 2 by the handle 44 and guiding it so that crop heads 14 are guided into the mouth 34. The crop heads 14 are engaged by the flail subassembly 50, the tines 64 of which engage the heads 14 and substantially remove them from the stalks 16. The converging walls of the mouth direct the grain heads 14 towards one side (e.g. the right side as shown in FIG. 3) of the flail subassembly 50 so that the seeds 18 are pulled into the flailing chamber 51. The head material (i.e. seeds 18 and chaffe 20) falls from the flailing chamber 51 onto the sieve panel 70. The grain shield 49 cooperates with the flail subassembly 50 to substantially contain the head material within the flailing chamber 51 until it drops onto the sieve panel front end 72.

Due to the front-to-back downward slope of the sieve panel 70 and the orientation of the shaft 52 which is generally vertical (i.e. the flail subassembly 50 rotational axis is angled from a direction normal to the sieve panel 70), the cam plate 86 raises and lowers the sieve panel front end 72 in a cycle corresponding to the rotation of the cam plate 86.

The sieve panel 70 thus oscillates whereby the chaffe 20 is separated from the seeds 18, with the chaffe 20 exiting the chaffe discharge opening 38 in the rear wall 30 and the seeds 18 falling through the perforations 82 into the housing lower compartment 33. The collected seeds 18 can be discharged by opening the discharge door 37 and pouring them out of the thrasher 10.

The thrasher 10 can be adapted to thrash a variety of materials, such as various above-ground crop plants and particularly seed-head grains including wheat, milo, barley, sorghum, etc. Furthermore, other harvesting features can be provided, including sickle bars across the front and reels for gathering the crop heads. Thus, many of the features that are found on combines and full-scale thrashing equipment can be utilized on a smaller scale with a portable thrasher such as that shown at 10. The collected grain can be used for moisture content analysis, and can also be used for various other purposes such as harvesting on a relatively limited scale for livestock feeding and other appropriate uses of the harvested grain.

V. Alternative Embodiment

A portable thrasher 110 comprising an alternative or modified embodiment of the present invention is shown in FIG. 5 and includes an impeller subassembly 112 positioned adjacent to and partly within the mouth 34. The impeller subassembly 112 includes a shaft 114 with a generally vertical rotational axis and blades 116, which extend radially at intervals of approximately 120 degrees. The impeller blades 116 project into the mouth 34 through an impeller opening 118 in the guide panel 35. The impeller subassembly 112 can be drivingly connected to the flail subassembly 50 by a suitable power transmission mechanism, such as an endless belt or chain 120 reaved over appropriate pullies or sprockets 122 mounted on the impeller shaft 114 and the flail drive shaft 52. Alternatively, a gear drive mechanism could be provided.

In operation, the impeller subassembly 112 facilitates feeding head material to the flail subassembly 50 by engaging the crop heads 14 with the impeller blades 116 whereby the heads 14 are impelled rearwardly through the mouth 34 into the flailing chamber 51.

It is to be understood that while certain forms of the present invention have been illustrated and described herein, it is not to be limited to the specific forms or arrangement of parts described and shown.

What is claimed and desired to be secured by Letters Patent is as follows:

1. A thrasher, which includes:
   (a) a housing, which includes:
       (1) a housing interior;
       (2) a mouth opening to said housing interior;
       (3) a grain discharge opening to said housing interior; and
       (4) a chafe discharge opening to said housing interior; and
   (b) a thrashing assembly, which includes:
       (1) a rotatable flail subassembly rotatably mounted in said housing interior and including a rotational axis and tine means;
       (2) drive means drivingly connected to said flail subassembly; and
       (3) sieve means located within said housing interior generally below said flail subassembly.

2. The invention of claim 1 wherein said housing includes:
   (a) a front wall with said mouth opening and said grain discharge opening, said mouth opening being located above said grain discharge opening.

3. The invention of claim 1 wherein said housing includes:
   (a) a grain shield in said interior;
   (b) a flailing chamber partially enclosed by said grain shield; and
   (c) said flail subassembly being positioned generally between said mouth opening and said grain shield.

4. The invention of claim 3 wherein said grain shield has a rearwardly-convex, arcuate configuration.

5. The invention of claim 1, which includes:
   (a) said sieve means comprising a sieve panel; and
   (b) said sieve panel dividing said housing interior into upper and lower compartments.

6. A thrasher, which includes:
   (a) a housing, which includes:
       (1) a housing interior;
       (2) a mouth opening to said housing interior;
       (3) a grain discharge opening to said housing interior; and
       (4) a chafe discharge opening to said housing interior; and
   (b) a thrashing assembly, which includes:
       (1) a rotatable flail subassembly rotatably mounted in said housing interior and including a rotational axis and tine means;
       (2) drive means drivingly connected to said flail subassembly; and
       (3) sieve means within said housing interior, said sieve means comprising a sieve panel; and
       (4) said sieve panel dividing said housing interior into upper and lower compartments.

7. The invention of claim 6, which includes:
   (a) sieve panel oscillating means connected to said sieve panel for oscillating same.

8. The invention of claim 7 wherein:
   (a) said sieve panel oscillating means comprises a rotating cam connected to said drive means and engaging said sieve panel.

9. The invention of claim 7 wherein:

(a) said sieve panel slopes downwardly from front-to-back.

10. The invention of claim 7 wherein:
(a) said sieve panel includes front and back ends;
(b) said grain discharge opening is located below said sieve panel front end; and
(c) said chaffe discharge opening is located above said sieve panel back end.

11. A thrasher, which includes:
(a) a housing including:
  (1) a top;
  (2) a bottom;
  (3) a front;
  (4) a back;
  (5) first and second opposite sides;
  (6) an interior;
  (7) a mouth opening in said front to said interior;
  (8) a grain discharge opening to said interior; and
  (9) a chaffe discharge opening to said interior; and
(b) a thrashing assembly including:
  (1) drive means connected to said housing;
  (2) flail means drivingly connected to said drive means and positioned in said housing interior; and
  (3) sieve means positioned in said housing interior and dividing said housing interior into an upper, chaffe compartment and a lower, grain compartment;
(c) said mouth opening being open to said upper compartment;
(d) said grain discharge opening being open to said lower compartment; and
(e) said chaffe discharge opening being open to said upper compartment.

12. The invention of claim 11 wherein said housing includes:
(a) a grain shield in said interior upper compartment;
(b) a flailing chamber partially enclosed by said grain shield; and
(c) said flail means being positioned generally between said mouth opening and said grain shield.

13. The invention of claim 12 wherein:
(a) said flail means comprises a rotatable flail subassembly rotatably mounted in said flailing chamber and including a rotational axis and laterally-projecting tine means.

14. The invention of claim 13 wherein said flail subassembly includes:
(a) a drive shaft connected to said drive means; and
(b) a generally cylindrical body coaxially mounted on said drive shaft; and
(c) said tine means projecting from said body.

15. The invention of claim 14 wherein said thrashing assembly includes:
(a) said sieve means comprising a sieve panel;
(b) said drive shaft including an upper end drivingly connected to said drive means and a lower end; and
(c) eccentric cam means mounted on said drive shaft lower end for engaging and oscillating said sieve panel.

16. The invention of claim 15 wherein:
(a) said sieve panel slopes downwardly from front-to-back.

17. The invention of claim 11 wherein said housing includes:
(a) grain discharge opening being positioned in said front; and (b) a door mounted on said front and movable between an open position with said grain discharge opening open and a closed position with said grain discharge opening closed.

18. The invention of claim 11, which includes:
(a) said mouth opening converging rearwardly.

19. A thrasher, which comprises:
(a) a housing, which includes:
  (1) a top panel;
  (2) a bottom panel;
  (3) front and back end walls;
  (4) first and second opposite side walls;
  (5) a mouth opening in said front wall;
  (6) a side extension panel located within said mouth opening and extending rearwardly and inwardly from said front wall and said first side wall whereby said mouth opening has a rearwardly-converging configuration;
  (7) a horizontal panel mounted over said mouth opening in spaced relation below said top;
  (8) a lip extending transversely across said housing back panel below said chaffe discharge opening;
  (9) a rearwardly-convex grain shield having a configuration of a half cylinder and extending between said side walls in spaced relation rearwardly from said mouth opening;
  (10) a downwardly-open flailing chamber formed between the mouth opening and the grain shield within the housing interior; and
  (11) an access door mounted on said front panel and movable between an open position opening said grain discharge door and a closed position closing said grain discharge door;
(b) a thrashing assembly, which includes:
  (1) a drive unit having an electric motor, a rechargeable battery electrically connected to said motor, a handle connected to said housing top panel, a recharging jack mounted on said housing and electrically connected to said battery, a drive coupling connected to said motor, and an on-off switch mounted on said handle and electrically connected to said motor and said battery;
  (2) a flail subassembly having a drive shaft with an upper end attached to said drive coupling and a lower end, a cylindrical body coaxially mounted on said drive shaft between said drive shaft upper and lower ends, and a plurality of tines extending generally laterally outwardly from said body, said body and said tines generally being located in said flailing chamber;
  (3) a transverse bar extending transversely across said housing interior between the side walls thereof below said flailing chamber and including a receiver rotatably receiving said drive shaft;
  (4) a coupling mounted on said drive shaft below said body and rotatably engaging said transverse bar;
  (5) a sieve panel including a front end located in proximity to said housing front wall, a back end resting on said transverse lip, a first side edge located in proximity to said housing first side wall, a second side edge located in proximity to said housing second side wall, multiple perforations, and a rearwardly-and-downwardly sloping orientation; and (6) a cam including an eccentric lobe mounted on said drive shaft lower end and engaging said sieve panel front end; and (c) said sieve panel dividing said housing interior into an upper, chaffe compartment and a lower, grain compartment, said upper compartment including said flailing chamber.

20. A thrasher, which includes:

(a) a housing which includes:
  (1) a housing interior;
  (2) a mouth opening to said housing interior;
  (3) a grain discharge opening to said housing interior;
  (4) a chafe discharge opening to said housing interior;
  (5) a grain shield with a rearwardly-convex, arcuate configuration in said interior; and
  (6) a flailing chamber partially enclosed by said grain shield; and (b) a thrashing assembly, which includes:
  (1) a rotatably flail subassembly rotatably mounted in said housing interior and including a rotational axis and tine means;
  (2) drive means drivingly connected to said flail subassembly; and
  (3) said flail subassembly being positioned generally between said mouth opening and said grain shield.

* * * * *